Patented Mar. 28, 1950

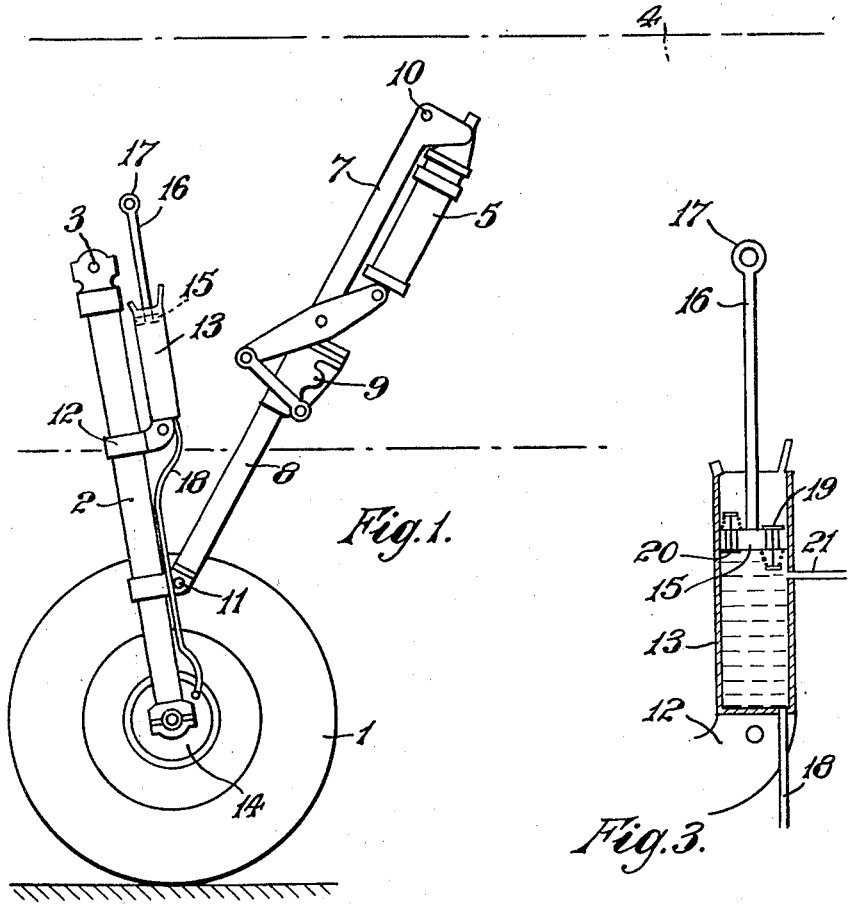
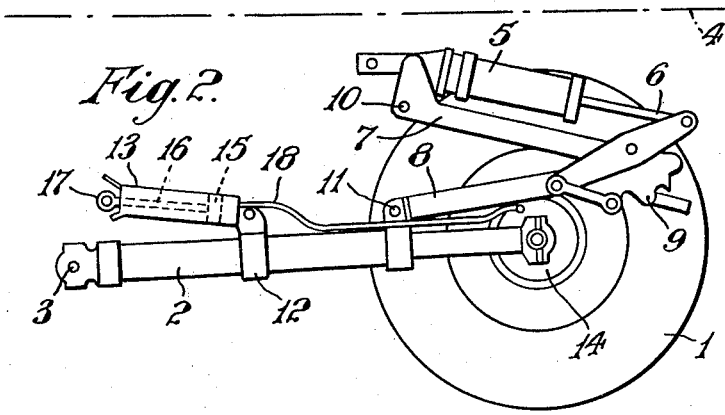

2,502,110

UNITED STATES PATENT OFFICE 2,502,110

BRAKE FOR AIRCRAFT WHEELS HAVING RETRACTABLE SUPPORTS

Henry Trevaskis, Birmingham, England, assignor to Dunlop Rubber Company Limited, London County, England, a British company Application June 5, 1946, Serial No. 674,536
In Great Britain June 12, 1945

6 Claims. (Cl. 244—102)

My invention relates to improvements in or concerning the operation of brakes for aircraft wheels having retractable supports.

Aircraft landing wheels continue to spin for a long time when the aircraft rises from the ground and when such wheels are imperfectly balanced their rotation is liable to render the aircraft unstable due to the vibration imparted thereto.

The continued rotation of such wheels is also liable to result in the accumulation of an undesirable electrostatic charge with accompanying risk of fire when a wheel so charged is retracted against the body of the aircraft.

Although landing wheels already fitted with brakes may be stopped from rotating by deliberate application of the brakes by the pilot, the invention has for its object to relieve the pilot of this procedure, when the landing wheels are retracted, and also to ensure a greater degree of safety by effecting automatically a temporary braking action sufficient to stop the spinning of the wheels concurrently with the raising of the undercarriage. The safeguard so provided is particularly useful in preventing the rotation of the nose wheels of tricycle type landing gear where such wheels are not already provided with brakes.

The desired effect may be obtained by means which are self contained and which impose no substantial additional load on existing pneumatic, hydraulic or electrical circuits with which the aircraft is already equipped but which may be used in conjunction therewith if desired.

According to this invention in an aircraft having a wheel retractable by the angular movement of the wheel support the said wheel being provided with a brake operable by fluid pressure, we provide means for automatically operating said brake when said wheel is retracted.

According to a further aspect of this invention we provide means for automatically operating the brake of the wheel of an aircraft when said wheel is retracted by the angular movement of the wheel support which comprises a cylinder attached to the said wheel support, a piston within said cylinder, a piston rod having the end remote from the piston pivotally connected to a portion of the aircraft carrying the wheel support at such a point that the angular movement of the wheel support causes the piston to move relatively to the cylinder and a pipe connection for conveying a fluid medium displaced by said piston from said cylinder to said brake.

In order that the invention may be more readily understood and carried into effect the same will now be described with reference to the accompanying drawings in which—

Fig. 1 shows a retractable support for an aircraft brake wheel provided with brake operating means constructed in accordance with the invention.

Fig. 2 shows the wheel support and brake operating means in the retracted position of the wheel support.

Fig. 3 is a part sectional view to an enlarged scale of the brake operating means shown in Figs. 1 and 2.

As shown in the drawings an aircraft wheel 1 is rotatably mounted on the lower end of a wheel support 2 which is retractable from the position shown in Fig. 1 to the retracted position shown in Fig. 2 by an anticlockwise movement of the wheel support 2 in angular relation to the body of the aircraft represented diagrammatically between the dotted lines 4. The wheel support 2 is pivoted to the structure of the aircraft about a pivot 3 located at the upper end of the wheel support 2, and is caused to swing upwards in relation to the aircraft by admission of fluid under pressure to a cylinder 5 containing a piston to which is connected a piston rod 6 Fig. 2.

The pressure of the fluid admitted to the cylinder 5 expels the piston rod 6 to the position shown in Fig. 2 and in so doing causes relative angular movement to take place between the two interpivoted parts 7 and 8. The part 7 is pivoted to the aircraft structure at 10, and the part 8 has a pivoted attachment at 11 to a bracket which is secured to the wheel support 2. A further bracket 12 secured to the support 2 acts as an abutment for the pivoted attachment of the lower end of the cylinder 13 which is aligned substantially parallel to the axis of the wheel support in the extended position as shown in Fig. 1, and is disposed on the side of the wheel support adjacent to the retracting members 7 and 8. The lower end of the cylinder has an outlet connected to a flexible pipe 18 through which fluid expelled from the cylinder is conducted to the wheel brake unit 14.

As shown in Fig. 3 the cylinder 13 contains a piston 15 having a piston rod 16 which is attached to the aircraft structure by a pivot 17 so located thereon in relation to the pivot 3 that when the wheel support occupies the extended position shown in Fig. 1 the piston rod 16 projects from the cylinder 13 along a line substantially parallel to the wheel support on the side thereof towards which the wheel support is caused to swing during retraction.

When the wheel support is retracted, the piston 15 is caused to move relative to the cylinder 13 and swings about its pivot 17 until the wheel support reaches the fully retracted position shown in Fig. 2.

During the retraction of the wheel support relative axial movement takes place between the cylinder and the piston 15 causing the piston to be thrust towards the lower end of the cylinder and to expel hydraulic fluid therefrom through the pipe 18 to the wheel brake unit 14. The wheel brake unit may be of the type having a circular support secured to the wheel support and carrying a plurality of brake shoes movable radially into contact with the brake drum of the wheel by the distention of a distensible annulus interposed between the shoes and such support.

In order to limit the pressure transmitted from the cylinders 13 to the wheel brake unit 14 the piston 15 Fig. 3 may be pierced and provided with a relief valve 19 displaceable by excess pressure from its seat against spring load during the working stroke of the piston. The piston may also be provided with a by-pass valve 20 which is spring loaded to permit the return of fluid through the piston during its withdrawal from the cylinder.

To enable the brake to be applied by the pilot when the wheel support is extended the cylinder may have connected thereto a pipe 21 for the admission of fluid to the cylinder through regulating valve apparatus operated by the pilot in known manner. The fluid medium is preferably a liquid such as oil in order to minimise the size of the cylinder as compared with one designed to operate pneumatically.

Having described my invention, what I claim is:

1. Means for automatically operating the brake of the wheel of an aircraft when said wheel is retracted which comprises a wheel and wheel support movable to and from the aircraft by angular movement of said support, a fluid-operated brake for said wheel, a cylinder attached to the said wheel support, a piston within said cylinder, a piston rod having the end remote from the piston pivotally connected to a portion of the aircraft carrying the wheel support at such a point that the angular movement of the wheel support causes the piston to move relatively to the cylinder and a pipe connection for conveying a fluid medium displaced by said piston from said cylinder to said brake.

2. Means for automatically operating the brake of the wheel of an aircraft when said wheel is retracted which comprises a wheel and wheel support movable to and from the aircraft by angular movement of said support, a cylinder attached to the wheel support, a piston within said cylinder, a piston rod connected to said piston and to said aircraft in position to cause said piston to move in said cylinder as said wheel moves to or from said aircraft and a fluid-operated wheel brake connected to said cylinder.

3. Means for automatically operating the brake of an aircraft wheel when said wheel is retracted which comprises a wheel and wheel support movable to and from said aircraft by angular movement of said support, a cylinder and piston connected between said support and said aircraft to cause relative movement of said cylinder and piston as said support is moved toward and from said aircraft, and a fluid-operated brake for said wheel connected to said cylinder.

4. The apparatus of claim 3 in which said cylinder has a connection to a manually actuated fluid supply.

5. The apparatus of claim 3 in which said cylinder has a port and a pressure relief valve therefor.

6. Means for automatically operating the brake of an aircraft wheel when said wheel is retracted, which comprises a wheel support movable to and from the aircraft, a brake for said wheel and a brake operating mechanism for moving said brake to brake applying and releasing positions, said brake operating mechanism comprising elements connected respectively to said wheel support and to a fixed point on said aircraft and a transmission between said relatively moving parts and said brake.

HENRY TREVASKIS.

REFERENCES CITED

The following references are of record in the file of this patent:

UNITED STATES PATENTS

| Number | Name | Date |
|---|---|---|
| 2,092,204 | Brown | Sept. 7, 1937 |
| 2,263,427 | Page | Nov. 18, 1941 |
| 2,347,847 | Schnell | May 2, 1944 |